Aug. 21, 1934.  J. C. BLACK  1,970,553
PROCESS FOR PRODUCING LOW BOILING POINT HYDROCARBONS
Original Filed Nov. 21, 1922
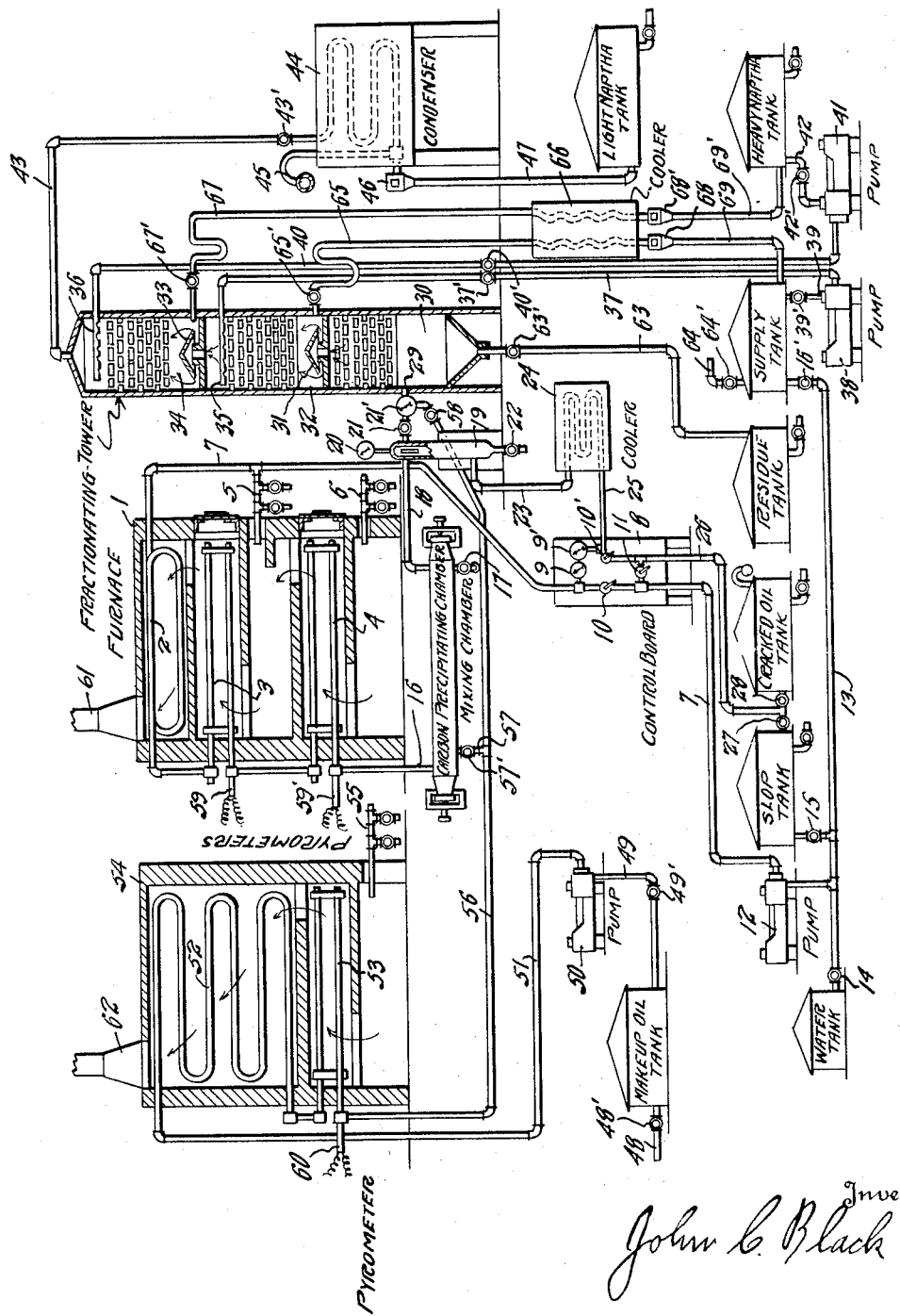
Inventor
John C. Black Patented Aug. 21, 1934

1,970,553

UNITED STATES PATENT OFFICE 1,970,553

PROCESS FOR PRODUCING LOW BOILING POINT HYDROCARBONS

John C. Black, Los Angeles, Calif., assignor, by mesne assignments, to Gasoline Products Company, Inc., Wilmington, Del., a corporation of Delaware Original application November 21, 1922, Serial No. 602,439. Divided and this application March 4, 1930, Serial No. 433,119. Renewed October 19, 1932

16 Claims. (Cl. 196—51)

This invention relates to the production of low boiling point hydrocarbons from those of high boiling point, and to a process and apparatus for accomplishing the conversion in a continuous manner, and is a division of my copending application Serial No. 602,439, filed November 21, 1922.

In my Patent 1,456,419, which is a continuation in part of my Patents Nos. 1,426,813 and 1,431,772, of which the parent application Serial No. 602,439 is also a continuation in part, I describe a process and apparatus for the production of low boiling point hydrocarbons from those of high boiling point.

My present invention is for an improvement thereon and I am enabled to increase the yield of low boiling point hydrocarbons and also effect a very great saving in cost and equipment in providing means for producing the hydrocarbons to be cracked from crude petroleum oils, petroleum residues or petroleum distillates, and in a continuous manner.

This result is obtained by my use of the apparatus and the process as described in my Patent 1,456,419 with the addition of certain equipment wherein the crude petroleum, the petroleum residues or the petroleum distillates are prepared for introduction into the apparatus as described in Patent 1,456,419.

In my present invention, I employ the same temperatures and pressures as employed in my previous patents above referred to, but instead of continually supplying cracking oil from an outside source to the supply tank, as shown in the drawing accompanying Patent 1,456,419, I employ a supply derived from the fractionating tower shown in the same application; the fractionating tower in turn deriving its supply of oil (or oil vapor) direct from an oil supply derived in part from the oil run through the cracking coils and in part from a new source of oil or of hydrocarbons, and such a quantity of additional new supply is injected into the fractionating tower that on vaporization and fractionation there will be produced sufficient of that fraction going to the supply tank as to make up for the amount extracted in the light naphtha, the heavy naphtha, and the residue; that is to say the quantity going to the supply tank is the same as that being drawn from the supply tank, the shortage being continually compensated for by the supply derived from the crude petroleum, the petroleum residues, or distil'ates as described.

To accomplish the above described results, I employ an oil heater, preferably of a tubular type, a form of which I show in the accompanying drawing, for preheating what I call the make-up oil and which may be crude petroleum, or any suitable petroleum residues, or any hydrocarbons that will produce the proper stock to be cracked and which is stored in the supply tank. The make-up oil, being properly preheated, is then injected into the fractionating tower where it is vaporized and fractionated, any heavy residues being drawn off through the bottom section of the tower, and the vapors ascending through the tower are fractionally condensed in the manner described in my before mentioned Patent 1,456,419. Together with the vapors from the make-up oil are the vapors from the oil that has passed through the converter or cracking coils— the condensates from the two intermingled vapors will form the various fractions that are the products of the process, such as the light naphtha, the heavy naphtha, and the converter supply stock stored in the supply tank. These various fractions are produced in a continuous manner as long as the make-up oil is continuously supplied.

The make-up oil may be injected into the fractionating tower in several ways:—First, by direct injection into the lower compartment of the tower; Second, by injection into a header 21' shown on the drawing to be mixed with the oil discharged through the pressure release and discharge valve 21, the header in turn discharging into the fractionating tower; Third, by having the oil under sufficient pressure to be discharged into the carbon precipitating chamber and mixer chamber.

In the accompanying drawing the last two methods of connection are shown and my preferred method of operating is the last above referred to. I choose this method for several reasons: First, I can cool the oil entering the carbon catcher from the cracking coil and at the same time increase the heat of the make-up oil, rendering it easier to vaporize; Second, by heating the make-up oil as is possible to a point above its cracking point, there will result an increased yield of low boiling point hydrocarbons obtained from the heavy fractions of the make-up oil which would not have been obtained otherwise; Third, the make-up oil, if heated above its cracking temperature, will have its viscosity very materially reduced and the residue drawn from the lower compartment of the fractionating tower will have a lower viscosity than if it had not been heated above its cracking point.

The advantage in cracking the make-up oil in the carbon catcher or mixer in place of the make-up oil heater is that there will be no undue fouling of the apparatus brought about by the formation of carbon, as the cracking will take place in a large body or bath of oil and the carbon will be held in suspension in the oil and swept out of the apparatus, whereas if the make-up oil were to be heated in a separate tubular heater, or as above mentioned in the make-up oil heater, to a point above its cracking temperature, there would be deposited a carbon residue that would soon foul the tubes and render the apparatus inoperative. Fourth—by the addition of a cooler hydrocarbon to the cracked hydrocarbons in the mixing chamber, the temperature of the mixture can be made such that the corrosive action of the sulphur or the sulphur compounds found in the oils will be materially reduced or may even be eliminated altogether, whereas if the heat of the cracked hydrocarbons was not reduced there would be a very destructive action by the sulphur or sulphur compounds forming sulphides with the metal parts of the apparatus.

For convenience in describing the process, the apparatus which I prefer to employ is illustrated in the accompanying drawing which is a part sectional, part elevational view of the apparatus.

The apparatus as shown in this application is practically that shown in Patent 1,456,419, which provides for two methods of operating—one through the fractionating tower and one through the cooler and to the cracked oil tank. I employ this same method of operating, as it makes the plant flexible and easy of control, but as before stated in this application, I have the additional make-up oil heater to properly heat the supplementary supply of hydrocarbons in order to make the process self-contained and a continuous one and to gain the advantages of increased yield of low boiling point hydrocarbons, the minimizing of the sulphur action and the reduction of the viscosity of the residue all as before described.

In the drawing, 1 represents a furnace equipped with cracking coils 2, 3 and 4; heated by oil or gas burners 5 and 6; connected to the coil 2 is a feed pipe 7 connecting with the control board 8 on which are mounted gauges 9 and 9' and valves 10 and 10' and crossover 11; from the control board pipe 7 connects with the discharge of the pump 12 which in turn takes suction through the pipe 13 to the water tank fitted with valve 14, also with the slop tank fitted with valve 15, and also with the supply tank fitted with valve 16'. The outlet of the coil 4 connects through pipe 16 to the carbon catcher and mixing chamber from which leads a blow-off connection and valve 17, and an oil discharge pipe 18 to the bypass trap 19, fitted with a gauge 20, and an upper discharge connection and valve 21, into the header 21' connecting with the fractionating tower, also a bottom blowoff connection and valve 22, and a lower discharge pipe 23 into the cooler 24, fitted with a discharge pipe 25 to the control board.

In the pipe 25 is a pressure reducing and discharge valve 10' discharging into pipe 26 which in turn connects with the slop tank through valve 27 and through valve 28 into the cracked oil tank. The pipe header 21' connects through pipe 29 into the compartment 30 of the fractionating tower—the upper portion of the compartment 30 is filled with tile. There is an umbrella covered opening 31 leading from the compartment 30 into compartment 32, the upper portion of which is filled with tile. There is an umbrella covered opening 33 from the compartment 32 into the compartment 34, the upper portion of which is filled with tile. Compartment 32 is fitted with a spray pipe 35 and compartment 34 is fitted with a spray pipe 36; spray pipe 35 is connected by pipe 37 and valve 37' to the pump 38 which in turn takes suction through pipe 39 and valve 39', from the supply tank; spray line 36 is connected by line 40 and valve 40' to the pump 41 which in turn takes suction through pipe 42 and valve 42' from the heavy naphtha tank.

From the top of the fractionating tower leads a vapor pipe 43, through valve 43', into the condenser 44, the terminal of which it fitted with a gas vent 45 and observation box 46, connected through pipe 47 to the light naphtha tank.

The supplementary supply of hydrocarbons is stored in the make-up oil tank and is supplied through the pipe 48 and valve 48'; the pump 50 takes suction on the make-up oil tank through pipe 49 and valve 49' and discharges through pipe 51 to the waste heat coil 52 and heating coil 53, both located in the furnace 54; the coils 52 and 53 are heated by means of the burner 55; the outlet of the coil 53 is connected through pipe 56 to the carbon precipitating chamber and mixing chamber through pipe 57 and valve 57', and also to the pipe header 21' through the valve 58.

The heating coils 3 and 4 in furnace 1 are fitted with pyrometers 59 and 59' and the heating coil 53 in furnace 54 is fitted with a pyrometer 60.

The furnaces 1 and 54 are fitted with stacks 61 and 62 respectively.

The fractionating tower is fitted with a conical bottom which forms the bottom of compartment 30 from which leads a pipe 63 and valve 63' to a residue tank.

The pipe 64 and valve 64' are connected to an outside source of supply of cracking oil and is used as an emergency supply.

The operation of the process is as follows:

The pump 12 takes suction through the pipe 13 and valve 16' with valves 14 and 15 closed, thereby giving the pump a supply of oil which is then discharged through the pipe 7 to the control board on which is mounted the valve 10 and which is now open to permit the oil to pass to the heating coils 2, 3 and 4, the crossover valve 11 being closed; from the coil 4 the oil passes through pipe 16 to the carbon precipitating and mixing chamber from whence it flows through pipe 18 to the bypass trap 19 through the pressure reducing and discharge valve 21 and into the pipe header 21' which in turn discharges into the fractionating tower through connection 29, the blow-off 22 on the bypass trap 19 being closed and valve 10' also being closed. If the oil is not properly cracked or is not sufficiently heated to properly vaporize in the fractionating tower, then valve 21 is closed and valves 10' and 27 opened to permit the oil to flow through the pipe 23 and cooler 24 to the control board, thence through pipe 26 to the slop tank from which it may be rerun.

When the oil is properly cracked and at a vaporizing temperature, it is discharged into the fractionating tower to be vaporized and fractionated. When this step in the process is reached, the pump 50 is started, taking its suction through pipe 49 and valve 49', pumping oil from the make-up oil tank and discharging it through the line 51 into the heating coils 52 and 53 from which it is discharged through the pipe 56, the connection 57 and valve 57' (valve 58 being closed) into the carbon precipitating and mixing chamber where it meets the highly heated cracked hydrocarbons coming from the cracking coils 2, 3 and 4, the temperature of which will be at times as high as 1000° F., but usually from around 650° F. to 900° F. The temperature of the make-up oil coming from the heating coils 52 and 53 is so regulated that substantially no cracking will occur in these coils, but when it is injected into the mixing chamber and is mixed with the highly heated cracked oil coming from the cracking coils 2, 3 and 4 there will result a temperature in the mixture which will be above the incipient cracking point of the make-up oil with the result that cracking will take place in the heavy fractions therein and thereby increase the total yield of the low boiling point hydrocarbons.

From the mixing chamber, the mixture of hydrocarbons passes to the fractionating tower which for convenience of construction may be built as depicted in the drawing and consists of three compartments, the lower one acting as a vaporizing compartment and residue collecting chamber, the second compartment as a condensing compartment, the condensing action being brought about by the oil sprayed into the upper portion of the compartment, the spray oil being the same as that which is condensed and is drawn from the supply tank through pump 38. The condensate drawn from the lower portion of the compartment 32 is run to the supply tank through pipe 65 and valve 65', cooler 66, look box 68 and pipe 69.

The make-up oil is usually crude petroleum or a petroleum residue which will contain the fractions desirable for cracking and when heated in its heater and then its heat increased by its introduction into the mixing chamber and discharged into the fractionating tower, it will more or less vaporize, the heavy tarry residues will precipitate and will be drawn off through pipe 63 and valve 63' into the residue tank, and the vaporized portion will ascend into the upper compartments; the heavier fractions will be condensed in the second compartment, lighter fractions in the third compartment, and the lightest fractions will pass out of the tower through pipe 43 and be condensed in the condenser 44 and run to the light naphtha tank through pipe 47 and observation box 46.

The condensate from the upper compartment is run to the heavy naphtha tank through the pipe 67, valve 67', cooler 66, observation box 68' and pipe 69'; the condensation of the heavy naphtha being brought about by the spray wash injected through the spray pipe 36, the spray wash being the heavy naphtha circulated by the pump 41 which takes suction through the suction pipe 42 and valve 42' connecting with the heavy naphtha tank and discharging through the pipe 40 and valve 40' into the spray pipe 36, in this manner condensing heavy naphtha with a condensing wash of heavy naphtha.

The proportion of make-up oil is so adjusted that its content of cracking distillate when separated in the fractionating tower and run to the supply tank will just compensate for the loss of stock taken from the supply tank and cracked in the coils 2, 3 and 4, and which on being fractionated will not be returned to the supply tank. This loss is represented by the light overhead fraction going to the condenser 44; the heavy naphtha fraction and the residue drawn off through pipe 63; these various fractions being derived from the original oil passing through coils 2, 3 and 4.

For instance, with a topped residuum as the make-up oil, it will require about 40% of residuum to 60% of cracking distillate to balance the operation and make the process a continuous one.

If I do not inject the heated make-up oil into the mixing chamber, I close valve 57' in pipe 57 and open valve 58 connecting with the header 21' from which it discharges into the fractionating tower through pipe 29 to be vaporized and fractionated as before described.

While I have shown and described the preferred embodiment of my invention, I wish it to be understood that I do not confine myself to the precise details of construction herein set forth, by way of illustration, as it is apparent that many changes and variations may be made therein, by one skilled in the art, without departing from the spirit of the invention, or exceeding the scope of the appended claims.

I claim:

1. A process of cracking hydrocarbon oils comprising heating a supply of hydrocarbon oil to cracking temperature, passing the highly heated oil to an enlarged zone, heating a second supply of hydrocarbons, mixing the heated second supply with the first supply in the enlarged zone maintaining sufficient pressure on the system to prevent substantial vaporization of the oil, cooling the mixture to a point substantially below cracking temperature and thereafter passing the cooled mixture without distilling off the lighter fractions to storage.

2. A process of cracking hydrocarbon oil comprising heating one supply of hydrocarbon oil in a furnace to a temperature sufficient to crack them and under a pressure sufficient to prevent any substantial vaporization, passing the said supply into a carbon precipitating and mixing chamber, separately heating a second supply of hydrocarbon oil and mixing the heated second supply with the first supply in the carbon precipitating chamber, withdrawing the mixture from said chamber and cooling the said mixture to a degree sufficient to prevent further cracking thereof, and passing the cooled mixture to storage without separating any of the lighter fractions.

3. A process of treating hydrocarbon oil to produce those of lower boiling point from those of higher boiling point comprising heating one supply of hydrocarbon oil in a tubular heating element to a temperature sufficient to crack them and under a pressure sufficient to prevent their substantial vaporization, passing the heated hydrocarbon oil to an enlarged chamber, separately heating a second supply of hydrocarbon oil, mixing the first and second supplies of hydrocarbon oil in the enlarged chamber, passing the mixed hydrocarbons without separation of lighter constituents to a cooling operation wherein they are cooled to a degree sufficient to prevent further cracking thereof, then reducing the pressure and passing the cooled hydrocarbons to storage without substantial vaporization thereof.

4. The process of cracking hydrocarbon oil comprising heating a supply of hydrocarbon oil to a temperature sufficient to crack them and under a pressure sufficient to prevent substantial vaporization thereof, heating a second supply of hydrocarbon oil in a separate heating element, discharging both supplies into a carbon precipitating and mixing chamber, maintaining sufficient pressure in said chamber to prevent substantial vaporization of the mixed oils passing the mixed hydrocarbons without separation of lighter constituents through a cooling operation wherein they are cooled to a degree sufficient to prevent further cracking thereof, then passing the cooled hydrocarbons to a zone of reduced pressure for storage without substantial vaporization thereof.

5. A process of cracking hydrocarbon oil comprising heating a supply of hydrocarbon oil in one furnace to a temperature sufficient to crack them, heating a second supply of hydrocarbon oil in a separate furnace, mixing both supplies after heating, then cooling the mixed oils to a degree sufficient to prevent further cracking thereof, maintaining a sufficient pressure upon the hydrocarbon oils through the point of cooling to prevent substantial vaporization thereof, reducing the pressure on the hydrocarbon oils after cooling, and passing to storage without substantial vaporization thereof.

6. A process of cracking hydrocarbon oil in substantially the liquid phase comprising heating a supply of hydrocarbon oil in a furnace to a temperature sufficient to crack them and under a pressure sufficient to prevent their substantial vaporization, heating a second supply of hydrocarbon oil in a separate furnace to a temperature below that at which substantial cracking occurs, discharging both supplies into a mixing chamber, passing the mixed hydrocarbons from the mixing chamber to a cooler wherein the mixture is cooled to a degree sufficient to prevent further cracking thereof, maintaining sufficient pressure upon the mixture through the point of cooling to prevent substantial vaporization thereof, reducing the pressure on the hydrocarbons after cooling, and passing them to storage without substantial vaporization thereof.

7. A process of cracking hydrocarbon oil comprising heating a primary continuous supply of hydrocarbon oil to a temperature sufficient to crack them and under a pressure sufficient to prevent vaporization thereof, admixing with such supply a cooler secondary continuous supply of hydrocarbon oil, governing the mixture of hydrocarbon oils so that the temperature of the mixed hydrocarbon oils will be sufficient to crack the high boiling fractions of the secondary supply, maintaining thereon a pressure sufficient to prevent material vaporization of the mixture of hydrocarbon oils, cooling the mixed hydrocarbon oils to a degree sufficient to prevent further cracking thereof, reducing the pressure on the hydrocarbons after cooling, and passing the cooled hydrocarbons to storage without substantial vaporization thereof.

8. A process of cracking hydrocarbon oil comprising heating a supply of hydrocarbon oil in a continuous coil in a single passage through a furnace to a temperature sufficient to crack them and under a pressure sufficient to prevent their substantial vaporization, separately heating a separate supply of hydrocarbon oil in a second furnace, discharging both supplies into a mixing chamber in which there is maintained sufficient pressure to prevent substantial vaporization of the mixed hydrocarbon oils, passing the mixed hydrocarbons under pressure through a cooler wherein they are cooled to a degree sufficient to prevent further cracking thereof, reducing pressure on the cooled hydrocarbons, and passing them to storage without substantial vaporization thereof.

9. The method of converting hydrocarbon oils which comprises maintaining a flowing stream of such oil at cracking temperature, separately heating a second supply of hydrocarbon oil to a predetermined temperature without effecting substantial cracking thereof, admixing the latter heated oil with the said heated cracked oil and maintaining the resulting heated mixture under superatmospheric pressure sufficient to prevent substantial vaporization of the mixture while cooling the mixture to a normal substantially atmospheric temperature to permit storage thereof without substantial vaporization, and passing the cooled mixture to storage without substantial vaporization of the said mixture.

10. The method of converting hydrocarbon oils which comprises maintaining a flowing stream of such oil at cracking temperature while maintaining the oil stream under superatmospheric pressure sufficient to prevent substantial vaporization thereof, separately heating a second supply of hydrocarbon oil to a predetermined temperature without effecting substantial cracking thereof, admixing the latter heated oil with the said heated cracked oil and maintaining the resulting heated mixture under superatmospheric pressure sufficient to prevent substantial vaporization of the mixture while cooling the mixture to a normal substantially atmospheric temperature to permit storage thereof without substantial vaporization, and passing the cooled mixture to storage without substantial vaporization of the said mixture.

11. The method of converting hydrocarbon oils which comprises maintaining a flowing stream of such oil at cracking temperature, separately heating a second supply of hydrocarbon oil of substantially different character to a predetermined temperature without effecting substantial cracking thereof, admixing the latter heated oil with the said heated cracked oil and maintaining the resulting heated mixture under superatmospheric pressure sufficient to prevent substantial vaporization of the mixture while cooling the mixture to a normal substantially atmospheric temperature to permit storage thereof without substantial vaporization, and passing the cooled mixture to storage without substantial vaporization of the said mixture.

12. The method of converting hydrocarbon oils which comprises maintaining a flowing stream of such oil at cracking temperature, separately heating a second supply of hydrocarbon oil to a predetermined temperature without effecting substantial cracking thereof, admixing the latter heated oil with the said heated oil undergoing cracking, governing the mixture of hydrocarbons so that the temperature of the resulting mixture will be sufficient to effect cracking of constituents of the said second supply of hydrocarbons, maintaining the resulting heated mixture under superatmospheric pressure sufficient to prevent substantial vaporization of the mixture while cooling the mixture to a normal substantially atmospheric temperature to permit storage thereof without substantial vaporization, and passing the cooled mixture to storage.

13. The method of converting hydrocarbon oils which comprises maintaining a flowing stream of such oil at cracking temperature while maintaining the oil stream under superatmospheric pressure sufficient to prevent substantial vaporization thereof, separately heating a second supply of hydrocarbon oil to a predetermined temperature without effecting substantial cracking thereof, admixing the latter heated oil with the said heated oil undergoing cracking, governing the mixture of hydrocarbons so that the temperature of the resulting mixture will be sufficient to effect cracking of constituents of the said second supply of hydrocarbons, maintaining the resulting heated mixture under superatmospheric pressure sufficient to prevent substantial vaporization of the mixture while cooling the mixture to a normal substantially atmospheric temperature to permit storage thereof without substantial vaporization, and passing the cooled mixture to storage.

14. The method of converting hydrocarbon oils which comprises maintaining a flowing stream of such oil at cracking temperature while maintaining it under superatmospheric pressure sufficient to maintain it in the liquid phase while avoiding separation of any portion of the said oil, separately heating a second supply of the hydrocarbon oil, admixing the latter heated oil with the said stream of highly heated cracked oil to thereby substantially raise the temperature of the said heated second supply of oil to a higher temperature at which substantial cracking occurs while avoiding separation of any portion of the said mixture and while maintaining the resulting mixture under a superatmospheric pressure sufficient to maintain it in the liquid phase, and then cooling the said resulting mixture to a temperature at which substantially no cracking occurs, said cooling being effected prior to the separation of any portion of the said mixture and while maintaining the said mixture under superatmospheric pressure sufficient to prevent substantial vaporization thereof, and then passing the cooled mixture to storage without substantial vaporization thereof.

15. The method of converting hydrocarbon oil which comprises maintaining a flowing stream of such oil at cracking temperature while maintaining the oil stream under superatmospheric pressure sufficient to prevent substantial vaporization thereof and avoiding separation of any portion of the said oil stream, separately heating a second supply of the hydrocarbon oil in a confined stream to a lower temperature without substantially cracking said oil, admixing the latter heated oil stream with the said stream of heated cracked oil while avoiding separation of any portion of the resulting mixture and while maintaining the resulting mixture under a superatmospheric pressure sufficient to maintain it in the liquid phase, and then cooling the said resulting mixture to a temperature at which substantially no cracking occurs, said cooling being effected prior to the separation of any portion of the said mixture and while maintaining the said mixture under superatmospheric pressure sufficient to prevent substantial vaporization thereof, and then passing the cooled mixture to storage without substantial vaporization thereof.

16. The method of converting hydrocarbon oils which comprises maintaining a flowing stream of such oil at cracking temperature while maintaining it under a superatmospheric pressure sufficient to maintain it in the liquid phase and while avoiding separation of any portion of said oil stream, separately heating a second supply of hydrocarbon oil to a lower temperature without effecting substantial cracking thereof, admixing the latter heated oil with the said heated oil undergoing cracking and while maintaining the resulting mixture under a superatmospheric pressure sufficient to maintain it in the liquid phase, governing the mixture of hydrocarbons so that the temperature of the resulting mixture will be sufficient to effect cracking of constituents of the said second supply of hydrocarbons while avoiding separation of any portion of the said mixture and then cooling the said mixture to a point substantially below cracking temperature, said cooling being effected prior to any separation of any portion of the said mixture and while maintaining it under a superatmospheric pressure sufficient to maintain it in the liquid phase, and then passing the cooled mixture to storage without substantial vaporization thereof.

JOHN C. BLACK.